(12) United States Patent
Salehifar et al.

(10) Patent No.: US 11,265,549 B2
(45) Date of Patent: Mar. 1, 2022

(54) METHOD FOR IMAGE CODING USING CONVOLUTION NEURAL NETWORK AND APPARATUS THEREOF

(71) Applicant: LG Electronics Inc., Seoul (KR)

(72) Inventors: Mehdi Salehifar, Seoul (KR); Seunghwan Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/044,570

(22) PCT Filed: Mar. 27, 2019

(86) PCT No.: PCT/KR2019/003574
§ 371 (c)(1),
(2) Date: Oct. 1, 2020

(87) PCT Pub. No.: WO2019/194460
PCT Pub. Date: Oct. 10, 2019

(65) Prior Publication Data
US 2021/0099710 A1    Apr. 1, 2021

Related U.S. Application Data

(60) Provisional application No. 62/651,235, filed on Apr. 1, 2018.

(51) Int. Cl.
| | |
|---|---|
| *H04N 19/00* | (2014.01) |
| *H04N 19/132* | (2014.01) |
| *H04N 19/117* | (2014.01) |
| *H04N 19/176* | (2014.01) |
| *H04N 19/46* | (2014.01) |

(Continued)

(52) U.S. Cl.
CPC ............. *H04N 19/132* (2014.11); *G06N 3/02* (2013.01); *H04N 19/117* (2014.11); *H04N 19/176* (2014.11); *H04N 19/46* (2014.11); *H04N 19/82* (2014.11)

(58) Field of Classification Search
CPC ...... H04N 19/86; H04N 19/46; H04N 19/117; H04N 19/132; H04N 19/70; H04N 19/82; H04N 19/176; H04N 19/122; G06N 3/08; G06N 3/02
See application file for complete search history.

(56) References Cited

U.S. PATENT DOCUMENTS

| | | | |
|---|---|---|---|
| 2016/0196672 A1* | 7/2016 | Chertok | ............... G06K 9/4628 382/156 |
| 2016/0259994 A1* | 9/2016 | Ravindran | ............... G06N 3/08 |

(Continued)

FOREIGN PATENT DOCUMENTS

| | | |
|---|---|---|
| KR | 20180001428 | 1/2018 |
| WO | WO2017/178827 | 10/2017 |

*Primary Examiner* — Zhihan Zhou
(74) *Attorney, Agent, or Firm* — Fish & Richardson P.C.

(57) ABSTRACT

A method for image decoding performed by a decoding apparatus, according to the present disclosure, comprises the steps of: obtaining residual information for a current block from a bitstream; deriving a prediction sample for the current block; deriving a residual sample for the current block on the basis of the residual information; deriving a reconstructed picture on the basis of the prediction sample and the residual sample; and performing filtering on the reconstructed picture on the basis of a convolution neural network (CNN).

9 Claims, 13 Drawing Sheets

(51) Int. Cl.
 *H04N 19/82* (2014.01)
 *G06N 3/02* (2006.01)

(56) References Cited

U.S. PATENT DOCUMENTS

2017/0132758 A1* 5/2017 Paluri .................... G06T 7/246
2019/0230354 A1* 7/2019 Kim .................... H04N 19/176

* cited by examiner

METHOD FOR IMAGE CODING USING CONVOLUTION NEURAL NETWORK AND APPARATUS THEREOF

CROSS-REFERENCE TO RELATED APPLICATIONS

This application is a National Stage application under 35 U.S.C. § 371 of International Application No. PCT/KR2019/003574, filed on Mar. 27, 2019, which claims the benefit of U.S. Provisional Application No. 62/651,235 filed on Apr. 1, 2018. The disclosures of the prior applications are incorporated by reference in their entirety.

BACKGROUND OF THE DISCLOSURE

Field of the Disclosure

The present disclosure relates to an image coding technology, and more specifically, to an image decoding method and apparatus using a convolution neural network in an image coding system.

Related Art

Demand for high-resolution, high-quality images such High Definition (HD) images and Ultra High Definition (UHD) images have been increasing in various fields. As the image data has high resolution and high quality, the amount of information or bits to be transmitted increases relative to the legacy image data. Accordingly, when image data is transmitted using a medium such as a conventional wired/wireless broadband line or image data is stored using an existing storage medium, the transmission cost and the storage cost thereof are increased.

Accordingly, there is a need for a highly efficient image compression technique for effectively transmitting, storing, and reproducing information of high resolution and high quality images.

SUMMARY

An object of the present disclosure is to provide a method and an apparatus for enhancing image coding efficiency.

Another object of the present disclosure is to provide an image decoding method and apparatus for performing a filtering for a current picture based on a convolution neural network.

Still another object of the present disclosure is to provide an image decoding method and apparatus for replacing a conventional post filtering using a filtering based on a convolution neural network.

An exemplary embodiment of the present disclosure provides an image decoding method performed by a decoding apparatus. The method includes: obtaining residual information about a current block from a bitstream, deriving a prediction sample for the current block, deriving a residual sample for the current block based on the residual information, deriving a reconstructed picture based on the prediction sample and the residual sample, and performing a filtering on the reconstructed picture based on a convolution neural network (CNN).

Another exemplary embodiment of the present disclosure provides a decoding apparatus for performing an image decoding. The decoding apparatus includes: an entropy decoder for obtaining residual information for a current block from a bitstream, a predictor for deriving a prediction sample for the current block, a transformer for deriving a residual sample for the current block based on the residual information, an adder for deriving a reconstructed picture based on the prediction sample and the residual sample, and a filter for performing a filtering on the reconstructed picture based on a convolution neural network (CNN).

Still another exemplary embodiment of the present disclosure provides a video encoding method performed by an encoding apparatus. The method includes: deriving a prediction sample for a current block, generating a residual sample for the current block based on the prediction sample and an original sample for the current block, deriving a reconstructed picture based on the prediction sample and the residual sample, performing a filtering on the reconstructed picture based on a convolution neural network (CNN), and encoding information about a post filtering and residual information.

Yet another exemplary embodiment of the present disclosure provides a video encoding apparatus. The encoding apparatus includes: a predictor for deriving a prediction sample for a current block, a subtractor for generating a residual sample for the current block based on the prediction sample and an original sample for the current block, an adder for deriving a reconstructed picture based on the prediction sample and the residual sample, a filter for performing a filtering on the reconstructed picture based on a convolution neural network (CNN), and an entropy encoder for encoding information about a post filtering and residual information.

The present disclosure may perform the filtering based on the convolution neural network (CNN) to reflect the characteristics of the current picture to perform the filtering, thereby improving the subjective/objective image qualities.

The aforementioned present disclosure may perform the filtering based on the convolution neural network (CNN) to replace the conventional post filtering process such as the deblocking filtering, the SAO, and/or the ALF, thereby improving the subjective/objective image qualities.

DESCRIPTION OF EXEMPLARY EMBODIMENTS

Figure 1:
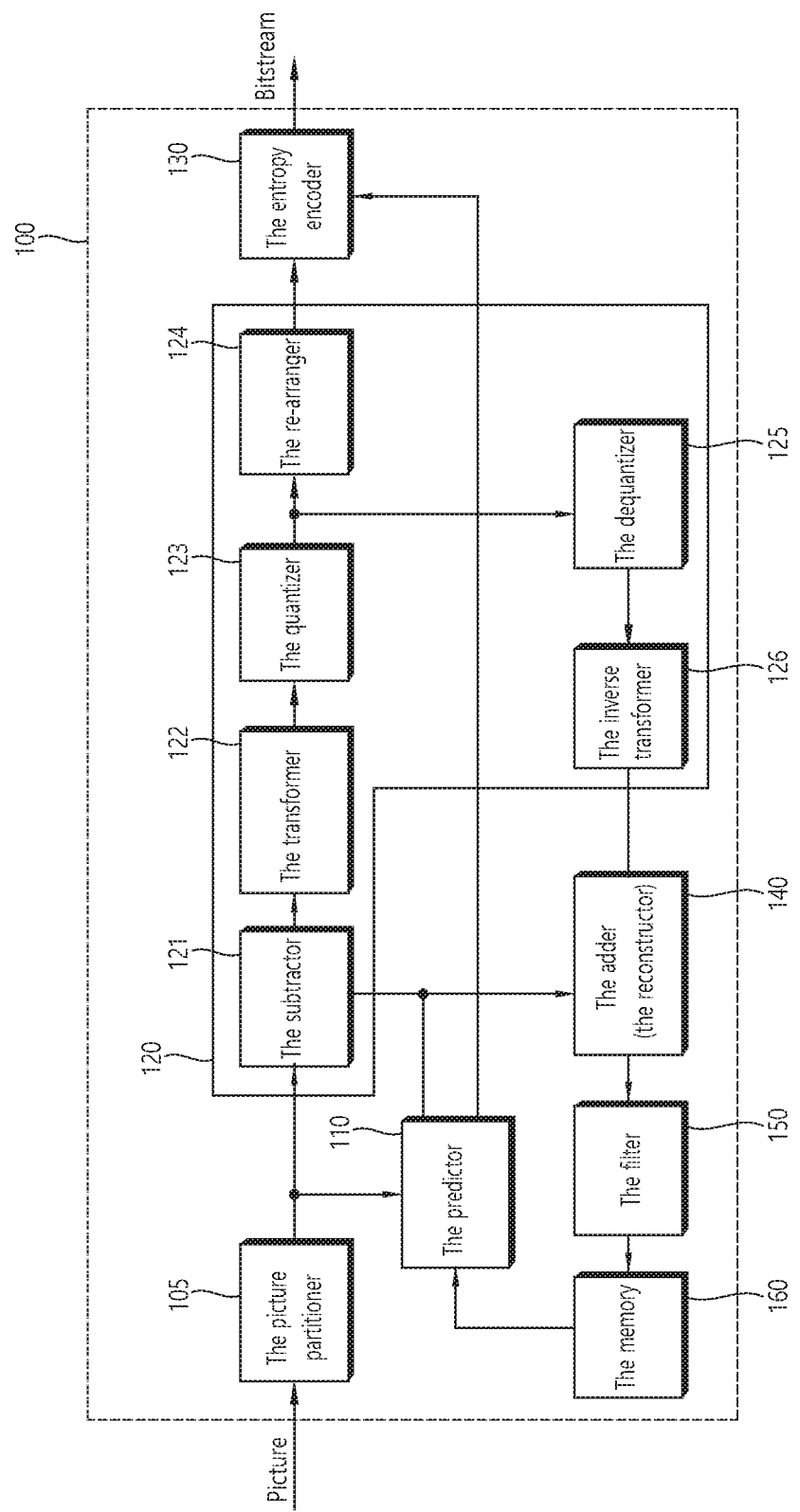
FIG. 1 is a schematic diagram illustrating a configuration of a video encoding apparatus to which the present disclosure is applicable.

The present disclosure may be modified in various forms, and specific embodiments thereof will be described and illustrated in the drawings. However, the embodiments are not intended for limiting the disclosure. The terms used in the following description are used to merely describe specific embodiments, but are not intended to limit the disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, elements in the drawings described in the disclosure are independently drawn for the purpose of convenience for explanation of different specific functions, and do not mean that the elements are embodied by independent hardware or independent software. For example, two or more elements of the elements may be combined to form a single element, or one element may be divided into plural elements. The embodiments in which the elements are combined and/or divided belong to the disclosure without departing from the concept of the disclosure.

Hereinafter, embodiments of the present disclosure will be described in detail with reference to the accompanying drawings. In addition, like reference numerals are used to indicate like elements throughout the drawings, and the same descriptions on the like elements will be omitted.

Meanwhile, the present disclosure relates to video/image coding. For example, the method(s)/embodiment(s) disclosed in the present disclosure may be applied to a method disclosed in a versatile video coding (VVC) standard or a next generation video/image coding standard.

In the present specification, generally a picture means a unit representing an image at a specific time, a slice/tile is a unit constituting a part of the picture. A slice/tile may include one or more coding tree units (CTU). One picture may be composed of plural slices/tiles, and the terms of a picture and a slice/tile may be mixed with each other as occasion demands. One tile group may include one or more tiles.

A pixel or a pel may mean a minimum unit constituting one picture (or image). Further, a "sample" may be used as a term corresponding to a pixel. The sample may generally represent a pixel or a value of a pixel, may represent only a pixel (a pixel value) of a luma component, and may represent only a pixel (a pixel value) of a chroma component.

A unit indicates a basic unit of image processing. The unit may include at least one of a specific area and information related to the area. Optionally, the unit may be mixed with terms such as a block, an area, or the like. In a typical case, an M×N block may represent a set of samples or transform coefficients arranged in M columns and N rows.

FIG. 1 is a schematic diagram illustrating a configuration of a video encoding device to which the present disclosure is applicable.

Referring to FIG. 1, a video encoding device 100 may include a picture partitioner 105, a predictor 110, a residual processor 120, an entropy encoder 130, an adder 140, a filter 150, and a memory 160. The residual processor 120 may include a subtractor 121, a transformer 122, a quantizer 123, a re-arranger 124, a dequantizer 125, an inverse transformer 126.

The picture partitioner 105 may split an input picture into at least one processing unit.

In an example, the processing unit may be referred to as a coding unit (CU). In this case, the coding unit may be recursively split from the largest coding unit (LCU) according to a quad-tree binary-tree (QTBT) structure. For example, one coding unit may be split into a plurality of coding units of a deeper depth based on a quad-tree structure and/or a binary tree structure. In this case, for example, the quad tree structure may be first applied and the binary tree structure may be applied later. Alternatively, the binary tree structure may be applied first. The coding procedure according to the present disclosure may be performed based on a final coding unit which is not split any further. In this case, the largest coding unit may be used as the final coding unit based on coding efficiency, or the like, depending on image characteristics, or the coding unit may be recursively split into coding units of a lower depth as necessary and a coding unit having an optimal size may be used as the final coding unit. Here, the coding procedure may include a procedure such as prediction, transformation, and reconstruction, which will be described later.

In another example, the processing unit may include a coding unit (CU) prediction unit (PU), or a transform unit (TU). The coding unit may be split from the largest coding unit (LCU) into coding units of a deeper depth according to the quad tree structure. In this case, the largest coding unit may be directly used as the final coding unit based on the coding efficiency, or the like, depending on the image characteristics, or the coding unit may be recursively split into coding units of a deeper depth as necessary and a coding unit having an optimal size may be used as a final coding unit. When the smallest coding unit (SCU) is set, the coding unit may not be split into coding units smaller than the smallest coding unit. Here, the final coding unit refers to a coding unit which is partitioned or split to a prediction unit or a transform unit. The prediction unit is a unit which is partitioned from a coding unit, and may be a unit of sample prediction. Here, the prediction unit may be divided into sub-blocks. The transform unit may be divided from the coding unit according to the quad-tree structure and may be a unit for deriving a transform coefficient and/or a unit for deriving a residual signal from the transform coefficient. Hereinafter, the coding unit may be referred to as a coding block (CB), the prediction unit may be referred to as a prediction block (PB), and the transform unit may be referred to as a transform block (TB). The prediction block or prediction unit may refer to a specific area in the form of a block in a picture and include an array of prediction samples. Also, the transform block or transform unit may refer to a specific area in the form of a block in a picture and include the transform coefficient or an array of residual samples.

The predictor 110 may perform prediction on a processing target block (hereinafter, a current block), and may generate a predicted block including prediction samples for the current block. A unit of prediction performed in the predictor 110 may be a coding block, or may be a transform block, or may be a prediction block.

The predictor 110 may determine whether intra-prediction is applied or inter-prediction is applied to the current block. For example, the predictor 110 may determine whether the intra-prediction or the inter-prediction is applied in unit of CU.

In case of the intra-prediction, the predictor 110 may derive a prediction sample for the current block based on a reference sample outside the current block in a picture to which the current block belongs (hereinafter, a current picture). In this case, the predictor 110 may derive the prediction sample based on an average or interpolation of neighboring reference samples of the current block (case (i)), or may derive the prediction sample based on a reference sample existing in a specific (prediction) direction as to a prediction sample among the neighboring reference samples of the current block (case (ii)). The case (i) may be called a non-directional mode or a non-angular mode, and the case (ii) may be called a directional mode or an angular mode. In the intra-prediction, prediction modes may include as an example 33 directional modes and at least two non-directional modes. The non-directional modes may include DC mode and planar mode. The predictor 110 may determine the prediction mode to be applied to the current block by using the prediction mode applied to the neighboring block.

In case of the inter-prediction, the predictor 110 may derive the prediction sample for the current block based on a sample specified by a motion vector on a reference picture. The predictor 110 may derive the prediction sample for the current block by applying any one of a skip mode, a merge mode, and a motion vector prediction (MVP) mode. In case of the skip mode and the merge mode, the predictor 110 may use motion information of the neighboring block as motion information of the current block. In case of the skip mode, unlike in the merge mode, a difference (residual) between the prediction sample and an original sample is not transmitted. In case of the MVP mode, a motion vector of the neighboring block is used as a motion vector predictor and thus is used as a motion vector predictor of the current block to derive a motion vector of the current block.

In case of the inter-prediction, the neighboring block may include a spatial neighboring block existing in the current picture and a temporal neighboring block existing in the reference picture. The reference picture including the temporal neighboring block may also be called a collocated picture (colPic). Motion information may include the motion vector and a reference picture index. Information such as prediction mode information and motion information may be (entropy) encoded, and then output as a form of a bitstream.

When motion information of a temporal neighboring block is used in the skip mode and the merge mode, a highest picture in a reference picture list may be used as a reference picture. Reference pictures included in the reference picture list may be aligned based on a picture order count (POC) difference between a current picture and a corresponding reference picture. A POC corresponds to a display order and can be discriminated from a coding order.

The subtractor 121 generates a residual sample which is a difference between an original sample and a prediction sample. If the skip mode is applied, the residual sample may not be generated as described above.

The transformer 122 transforms residual samples in units of a transform block to generate a transform coefficient. The transformer 122 may perform transformation based on the size of a corresponding transform block and a prediction mode applied to a coding block or prediction block spatially overlapping with the transform block. For example, residual samples can be transformed using discrete sine transform (DST) transform kernel if intra-prediction is applied to the coding block or the prediction block overlapping with the transform block and the transform block is a 4×4 residual array and is transformed using discrete cosine transform (DCT) transform kernel in other cases.

The quantizer 123 may quantize the transform coefficients to generate quantized transform coefficients.

The re-arranger 124 rearranges quantized transform coefficients. The re-arranger 124 may rearrange the quantized transform coefficients in the form of a block into a one-dimensional vector through a coefficient scanning method. Although the re-arranger 124 is described as a separate component, the re-arranger 124 may be a part of the quantizer 123.

The entropy encoder 130 may perform entropy-encoding on the quantized transform coefficients. The entropy encoding may include an encoding method, for example, an exponential Golomb, a context-adaptive variable length coding (CAVLC), a context-adaptive binary arithmetic coding (CABAC), or the like. The entropy encoder 130 may perform encoding together or separately on information (e.g., a syntax element value or the like) required for video reconstruction in addition to the quantized transform coefficients. The entropy-encoded information may be transmitted or stored in unit of a network abstraction layer (NAL) in a bitstream form.

The dequantizer 125 dequantizes values (transform coefficients) quantized by the quantizer 123 and the inverse transformer 126 inversely transforms values dequantized by the dequantizer 125 to generate a residual sample.

The adder 140 adds a residual sample to a prediction sample to reconstruct a picture. The residual sample may be added to the prediction sample in units of a block to generate a reconstructed block. Although the adder 140 is described as a separate component, the adder 140 may be a part of the predictor 110. Meanwhile, the adder 140 may be referred to as a reconstructor or reconstructed block generator.

The filter 150 may apply deblocking filtering and/or a sample adaptive offset to the reconstructed picture. Artifacts at a block boundary in the reconstructed picture or distortion in quantization can be corrected through deblocking filtering and/or sample adaptive offset. Sample adaptive offset may be applied in units of a sample after deblocking filtering is completed. The filter 150 may apply an adaptive loop filter (ALF) to the reconstructed picture. The ALF may be applied to the reconstructed picture to which deblocking filtering and/or sample adaptive offset has been applied.

The memory 160 may store a reconstructed picture (decoded picture) or information necessary for encoding/decoding. Here, the reconstructed picture may be the reconstructed picture filtered by the filter 150. The stored reconstructed picture may be used as a reference picture for (inter) prediction of other pictures. For example, the memory 160 may store (reference) pictures used for inter-prediction. Here, pictures used for inter-prediction may be designated according to a reference picture set or a reference picture list.

Figure 2:
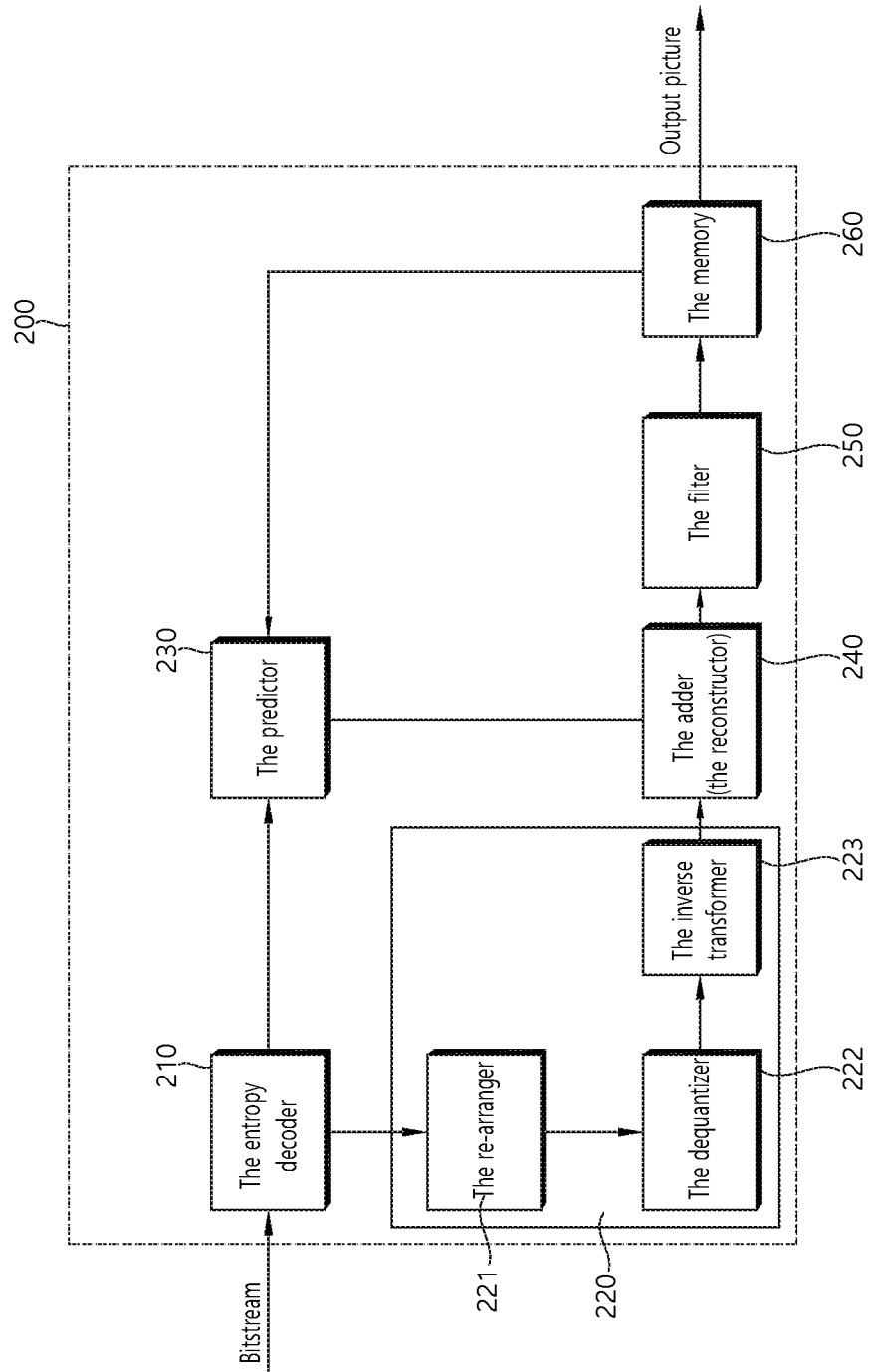
FIG. 2 is a schematic diagram illustrating a configuration of a video decoding apparatus to which the present disclosure is applicable.

FIG. 2 is a schematic diagram illustrating a configuration of a video decoding device to which the present disclosure is applicable.

Referring to FIG. 2, a video decoding device 200 may include an entropy decoder 210, a residual processor 220, a predictor 230, an adder 240, a filter 250, and a memory 260. The residual processor 220 may include a re-arranger 221, a dequantizer 222, an inverse transformer 223.

When a bitstream including video information is input, the video decoding device 200 may reconstruct a video in relation to a process by which video information is processed in the video encoding device.

For example, the video decoding device 200 may perform video decoding using a processing unit applied in the video encoding device. Thus, the processing unit block of video decoding may be, for example, a coding unit and, in another example, a coding unit, a prediction unit or a transform unit. The coding unit may be split from the largest coding unit according to the quad tree structure and/or the binary tree structure.

A prediction unit and a transform unit may be further used in some cases, and in this case, the prediction block is a block derived or partitioned from the coding unit and may be a unit of sample prediction. Here, the prediction unit may be divided into sub-blocks. The transform unit may be split from the coding unit according to the quad tree structure and may be a unit that derives a transform coefficient or a unit that derives a residual signal from the transform coefficient.

The entropy decoder 210 may parse the bitstream to output information required for video reconstruction or picture reconstruction. For example, the entropy decoder 210 may decode information in the bitstream based on a coding method such as exponential Golomb encoding, CAVLC, CABAC, or the like, and may output a value of a syntax element required for video reconstruction and a quantized value of a transform coefficient regarding a residual.

More specifically, a CABAC entropy decoding method can receive a bin corresponding to each syntax element in a bitstream, determine a context model using decoding target syntax element information and decoding information of neighboring and decoding target blocks or information of symbol/bin decoded in a previous step, predict bin generation probability according to the determined context model and perform arithmetic decoding of the bin to generate a symbol corresponding to each syntax element value. Here, the CABAC entropy decoding method can update the context model using information of a symbol/bin decoded for a context model of the next symbol/bin after determination of the context model.

Information on prediction among information decoded in the entropy decoder 210 may be provided to the predictor 230 and residual values, that is, quantized transform coefficients, on which entropy decoding has been performed by the entropy decoder 210 may be input to the re-arranger 221.

The re-arranger 221 may rearrange the quantized transform coefficients into a two-dimensional block form. The re-arranger 221 may perform rearrangement corresponding to coefficient scanning performed by the encoding device. Although the re-arranger 221 is described as a separate component, the re-arranger 221 may be a part of the dequantizer 222.

The dequantizer 222 may de-quantize the quantized transform coefficients based on a (de)quantization parameter to output a transform coefficient. In this case, information for deriving a quantization parameter may be signaled from the encoding device.

The inverse transformer 223 may inverse-transform the transform coefficients to derive residual samples.

The predictor 230 may perform prediction on a current block, and may generate a predicted block including prediction samples for the current block. A unit of prediction performed in the predictor 230 may be a coding block or may be a transform block or may be a prediction block.

The predictor 230 may determine whether to apply intra-prediction or inter-prediction based on information on a prediction. In this case, a unit for determining which one will be used between the intra-prediction and the inter-prediction may be different from a unit for generating a prediction sample. In addition, a unit for generating the prediction sample may also be different in the inter-prediction and the intra-prediction. For example, which one will be applied between the inter-prediction and the intra-prediction may be determined in unit of CU. Further, for example, in the inter-prediction, the prediction sample may be generated by determining the prediction mode in unit of PU, and in the intra-prediction, the prediction sample may be generated in unit of TU by determining the prediction mode in unit of PU.

In case of the intra-prediction, the predictor 230 may derive a prediction sample for a current block based on a neighboring reference sample in a current picture. The predictor 230 may derive the prediction sample for the current block by applying a directional mode or a non-directional mode based on the neighboring reference sample of the current block. In this case, a prediction mode to be applied to the current block may be determined by using an intra-prediction mode of a neighboring block.

In the case of inter-prediction, the predictor 230 may derive a prediction sample for a current block based on a sample specified in a reference picture according to a motion vector. The predictor 230 may derive the prediction sample for the current block using one of the skip mode, the merge mode and the MVP mode. Here, motion information required for inter-prediction of the current block provided by the video encoding device, for example, a motion vector and information on a reference picture index may be obtained or derived based on the information on prediction.

In the skip mode and the merge mode, motion information of a neighboring block may be used as motion information of the current block. Here, the neighboring block may include a spatial neighboring block and a temporal neighboring block.

The predictor 230 may construct a merge candidate list using motion information of available neighboring blocks and use information indicated by a merge index on the merge candidate list as a motion vector of the current block. The merge index may be signaled by the encoding device. Motion information may include a motion vector and a reference picture. When motion information of a temporal neighboring block is used in the skip mode and the merge mode, a highest picture in a reference picture list may be used as a reference picture.

In the case of the skip mode, a difference (residual) between a prediction sample and an original sample is not transmitted, distinguished from the merge mode.

In the case of the MVP mode, the motion vector of the current block may be derived using a motion vector of a neighboring block as a motion vector predictor. Here, the neighboring block may include a spatial neighboring block and a temporal neighboring block.

When the merge mode is applied, for example, a merge candidate list can be generated using a motion vector of a reconstructed spatial neighboring block and/or a motion vector corresponding to a Col block which is a temporal neighboring block. A motion vector of a candidate block selected from the merge candidate list is used as the motion vector of the current block in the merge mode. The aforementioned information on prediction may include a merge index indicating a candidate block having the best motion vector selected from candidate blocks included in the merge candidate list. Here, the predictor 230 may derive the motion vector of the current block using the merge index.

When the MVP (Motion vector Prediction) mode is applied as another example, a motion vector predictor candidate list may be generated using a motion vector of a reconstructed spatial neighboring block and/or a motion vector corresponding to a Col block which is a temporal neighboring block. That is, the motion vector of the reconstructed spatial neighboring block and/or the motion vector corresponding to the Col block which is the temporal neighboring block may be used as motion vector candidates. The aforementioned information on prediction may include a prediction motion vector index indicating the best motion vector selected from motion vector candidates included in the list. Here, the predictor 230 may select a prediction motion vector of the current block from the motion vector candidates included in the motion vector candidate list using the motion vector index. The predictor of the encoding device may obtain a motion vector difference (MVD) between the motion vector of the current block and a motion vector predictor, encode the MVD and output the encoded MVD in the form of a bitstream. That is, the MVD can be obtained by subtracting the motion vector predictor from the motion vector of the current block. Here, the predictor 230 may obtain a motion vector included in the information on prediction and derive the motion vector of the current block by adding the motion vector difference to the motion vector predictor. In addition, the predictor may obtain or derive a reference picture index indicating a reference picture from the aforementioned information on prediction.

The adder 240 can add a residual sample to a prediction sample to reconstruct a current block or a current picture. The adder 240 may reconstruct the current picture by adding the residual sample to the prediction sample in units of a block. When the skip mode is applied, a residual is not transmitted and thus the prediction sample may become a reconstructed sample. Although the adder 240 is described as a separate component, the adder 240 may be a part of the predictor 230. Meanwhile, the adder 240 may be referred to as a reconstructor or reconstructed block generator.

The filter 250 may apply deblocking filtering, sample adaptive offset and/or ALF to the reconstructed picture. Here, sample adaptive offset may be applied in units of a sample after deblocking filtering. The ALF may be applied after deblocking filtering and/or application of sample adaptive offset.

The memory 260 may store a reconstructed picture (decoded picture) or information necessary for decoding. Here, the reconstructed picture may be the reconstructed picture filtered by the filter 250. For example, the memory 260 may store pictures used for inter-prediction. Here, the pictures used for inter-prediction may be designated according to a reference picture set or a reference picture list. A reconstructed picture may be used as a reference picture for other pictures. The memory 260 may output reconstructed pictures in an output order.

Meanwhile, neural networks based on learning data are already used in many fields, and a convolution neural network (CNN) among them shows outstanding performance in an image recognition field. The neural network may also be represented as an artificial neural network. Therefore, the present disclosure proposes image encoding/decoding methods using the CNN. First, the neural network and the CNN will be described later in detail as follows.

Figure 3:
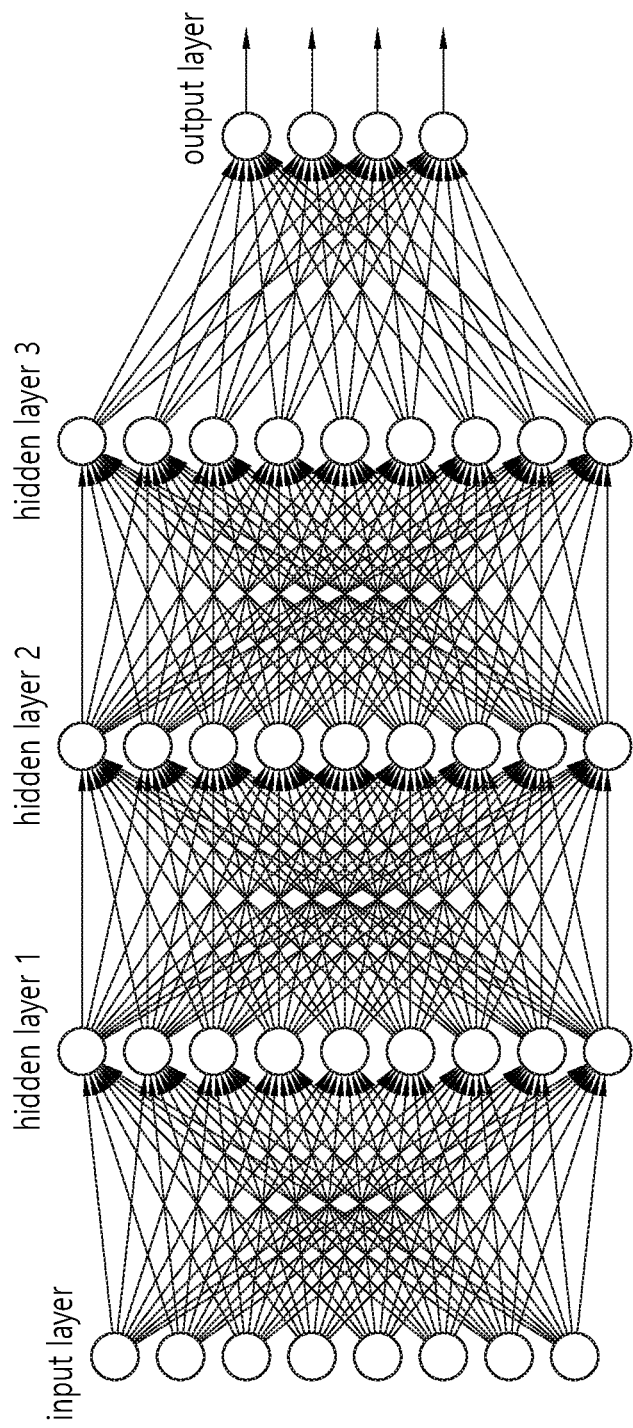
FIG. 3 exemplarily illustrates a neural network.

FIG. 3 exemplarily illustrates a neural network.

The neural network is a class of algorithms based on the idea of interconnected neurons. The neurons in a general neural network may include a data value, thereby affecting values of neurons to which the respective data values are connected according to the connection, such as whether the sum of a predefined strength for each connection and connections for the respective specific neurons exceeds a predefined threshold value. By determining appropriate connection strength and threshold value (a procedure also called "training"), the neural network may effectively recognize images and characters. To make the connection between groups more clear, and make the connection for each operation of the value, the neurons may be mainly grouped as a "layer". Referring to FIG. 3, the general neural network may include three types of layers. The three types of layers may include an input layer, a hidden layer, and an output layer.

The input layer may represent a layer for providing an input to the neural network model. The number of neurons of the input layer may be equal to the number of features of data. For example, the number of neurons of the input layer may be equal to the number of samples of an input picture.

The hidden layer may represent a layer between the input layer and the output layer. The input of the input layer may be supplied to the hidden layer. Further, the neural network may include one or more hidden layers according to the model and the size of the data. Generally, the hidden layer may include a larger number of neurons than the number of features. That is, generally, the hidden layer may include a larger number of neurons than the number of neurons of the input layer. Further, if a plurality of hidden layers exist, the hidden layers may include different numbers of neurons. The output of each hidden layer may be calculated by multiplying the output of a previous layer by a learnable weight of the corresponding hidden layer, and then adding an activation function making the neural network nonlinear followed by a learnable bias.

The output layer may represent the layer including the output of the neural network model. The output of the hidden layer may be transferred to a logistic function which transforms the output of each class.

The neural network illustrated in FIG. 3 may represent an exemplary embodiment called a fully-connected neural network. As illustrated in FIG. 3, each of the neurons of the layer may be connected to neurons of a next layer. For example, referring to FIG. 3, the neurons of the input layer may be connected to all neurons of a hidden layer 1. Further, as illustrated in FIG. 3, each of the neurons of the hidden layer 1 may receive an input value from each of the neurons of the input layer. Subsequently, the input values input to the neurons may be summed, and the summed value may be compared with the bias or the threshold value. If the summed value is larger than the threshold value of the neurons, the summed value may be used as a value used as the input for the neurons of a next layer in the neurons. The aforementioned operation may be performed through various layers of the neural network, and continuously performed until reaching a final layer, that is, an output layer.

Meanwhile, an example of the neural network includes the convolution neural network (CNN). The CNN shows excellent performance against many computer vision and machine learning problems. Specifically, the CNN shows excellent performance by the following reasons.

Character recognition.

Natural images have the characteristics called stationary.

Biological plausibility from a visual cortex

Here, the character may represent an area in which neighboring samples have high correlations and local features, and distant samples have low correlations. Further, the characteristics called stationary may mean the feature in which statistics of one portion of the image are the same as those of another portion thereof.

Unlike the fact that the neurons of the neural network receive the input value from all nodes of the previous layer, the input values of a set including features (i.e., nodes) spatially or temporally close to the node in the previous layer may be input to the neurons of a specific layer in the CNN. That is, the CNN may be operated by associating the arrangement of the values instead of a single value with each of the neurons. The set may also be represented as a receptive field. The set may be derived as a 3×3 set or a 5×5 set. An M×N set may represent a group of the nodes composed of M columns and N rows. Therefore, the CNN requires a function capable of processing a local 2-D structure.

Figure 4:
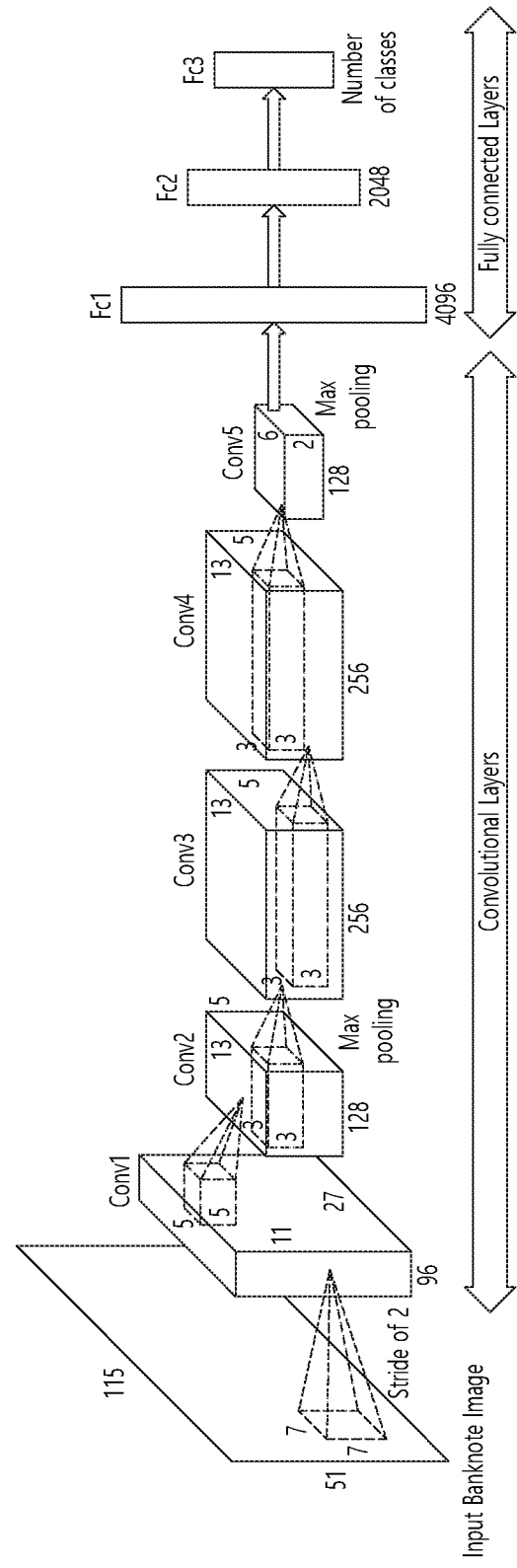
FIG. 4 exemplarily illustrates a convolution neural network.

FIG. 4 exemplarily illustrates the convolution neural network. Further, the set may be conceptually represented as a small image patch, and the convolution may be used for the transform of the values of the neurons for subsequent layers instead of multiplication. That is, the connection strength may be a convolution kernel rather than a scalar value. Referring to FIG. 4, the CNN may include three layers to be described later.

Convolution layer

Pooling layer

Fully-connected layer

The convolution layer may represent a layer for calculating the output value for the node connected to a local region of the input. The output value for each node may be calculated by a dot product between the weight and the regions connected to the input volume for the node. For example, the input for the node may be derived through a rectified linear unit (RELU) layer to which an elementwise activation function such as MAX (0, x) defined in the following Equation is applied.

$$\text{Max}(x, y) = \begin{cases} x & ; \ x >= y \\ y & ; \ x < y \end{cases} \quad \text{[Equation 1]}$$

The pulling layer may perform a down sampling operation according to a spatial dimension. The down sampling may represent a process of deriving the maximum value or the average value among the values of the nodes of the corresponding region. Subsequently, the output values of the pulling layer may be input as the input value for the fully-connected layer, that is, the fully-connected neural network.

Figure 5:
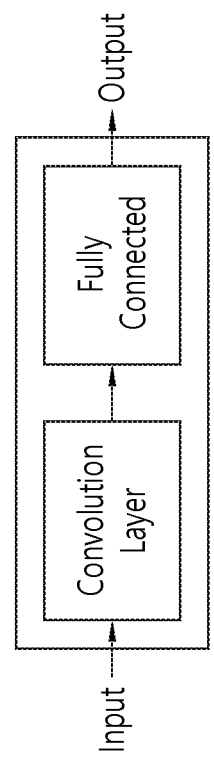
FIG. 5 exemplarily illustrates the CNN applied to the present disclosure.

FIG. 5 exemplarily illustrates the CNN applied to the present disclosure. Referring to FIG. 5, the input picture may pass through the convolution layers as described above, the values passing through the convolution layers may pass through the fully-connected layer, and thus the features, which are the output values, may be derived.

Specifically, for example, the encoding apparatus/the decoding apparatus may perform the convolution operation for the samples of the input block of the input picture. As an example, the convolution operation may be performed for the samples of the input block four times.

For example, when the input block is f(t) and the kernel is g(t), a first convolution operation may represent the convolution operation with a portion in which the input and the kernel overlap with each other by reversing the g(t). That is, the encoding apparatus/the decoding apparatus may multiply the value located for each element in the portion overlapping the kernel located on the top left of the input block of N×N and output the summation of products (SOP) result.

A second convolution operation may represent the convolution operation in the portion in which the input block and the kernel (i.e., kernel located on the top right) overlap with each other by moving the kernel used for the first convolution operation to the left one space. That is, the encoding apparatus/the decoding apparatus may multiply the value located for each element in the portion in which the input block and the kernel overlap with each other and output the result of the summation of products by moving the kernel used for the first convolution operation to the left one space.

A third convolution operation may represent the convolution operation in the portion in which the input block and the kernel (i.e., kernel located on the bottom right) overlap with each other by moving the kernel used for the second convolution operation to the bottom one space. That is, the encoding apparatus/decoding apparatus may multiply the value located for each element in the portion in which the input block and the kernel overlap with each other and output the result of the summation of products by moving the kernel used for the second convolution operation to the lower side one space.

A fourth convolution operation may represent the convolution operation in the portion in which the input block and the kernel (i.e., kernel located on the bottom left) overlap with each other by moving the kernel used for the third convolution operation to the right one space. That is, the encoding apparatus/the decoding apparatus may multiply the value located for each element in the portion in which the input block and the kernel overlap with each other and output the result of the summation of products by moving the kernel used for the third convolution operation to the right one space.

Subsequently, the encoding apparatus/the decoding apparatus may modify values output by performing the convolution operation (e.g., four values derived by performing the convolution operation four times) to a form of a nonlinear function through the activation function. The encoding apparatus/the decoding apparatus may extract the feature by performing the pooling operation for the output value through the activation function. Here, the pooling operation may represent a process of selecting one value of the values (e.g., four values) derived as described above according to a specific criterion. That is, since one level higher abstracted information may be extracted through the convolution operation, the pooling operation may represent a process of compressing and summarizing the size thereof so as to leave only the most important information from the abstracted information.

The encoding apparatus/the decoding apparatus may derive a plurality of features by performing the aforementioned convolution and pooling operations for a plurality of blocks included in the input picture. The features may also be represented as a feature map. Subsequently, the encoding apparatus/the decoding apparatus may output the fully-connected layer based on the feature map. That is, the encoding apparatus/decoding apparatus may derive the output value of the fully-connected layer based on the feature map.

Meanwhile, the CNN may be usefully used for a post filtering process of video coding or compression. Particularly, the CNN may be used to find an appropriate filter set for the current picture (or current block) among available filter sets. The procedure of deriving the appropriate filter set based on the CNN may be described as described later. The filter set may include filter taps and filter coefficients.

Phase 1: the input picture may be divided into a preset sample group. That is, the input picture may be divided into a block having a preset size. For example, the block may be a block having a 3×3 size, a block having a 5×5 size, or a CTU.

Phase 2: a plurality of features may be derived by applying a preset filtering process (i.e., convolution operation performed based on a preset kernel) to the preset block. For example, to derive an average feature (i.e., feature representing an average of the input samples), the same weighting factor may be applied to the samples of the block. That is, the kernel for the convolution operation may include the weighting factors having the same value. Alternatively, for example, to derive a high frequency feature between the input samples, the weighting factor such as a high frequency response may be applied to the samples of the block. That is, the kernel for the convolution operation may include a weighting factor whose value is like the high frequency response. Further, the Phase 2 may be applied with a plurality of phases, and the number and types of features may be different according to an application.

Phase 3: a filter used based on the final feature derived in the Phase 2 may be determined. Particularly, the filter used for the current picture may be determined using a logistic function for transforming the output features into a probability score of each filter set.

Since the aforementioned CNN may be usefully used for the post filtering process in the video coding, the present disclosure proposes an image coding method using the filtering process performed based on the CNN. Although exemplary embodiments proposed by the present disclosure have been described regarding the ITU-T H.264 standard, the ITU-T H.265 standard, the JEM exploration activity, and the VVC, the exemplary embodiments proposed by the present disclosure may also be applied to any video coding standard in addition to the aforementioned standards.

As an example, a method for replacing the deblocking filter and the sample adaptive offset (SAO) with the CNN may be proposed.

Figure 6:
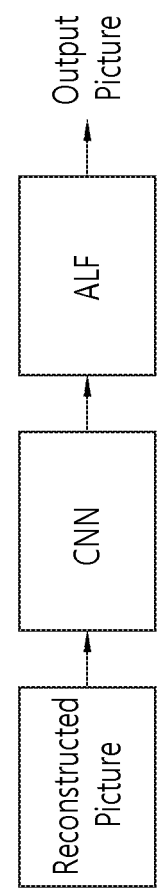
FIG. 6 illustrates an example of an image coding performed by replacing the deblocking filter and the SAO with the CNN.

FIG. 6 illustrates an example of the image coding performed by replacing the deblocking filter and the SAO with the CNN. Referring to FIG. 6, the reconstructed picture may pass through the CNN instead of the deblocking filter and the SAO. That is, referring to FIG. 6, the CNN may be applied to the reconstructed picture instead of the deblocking filter and the SAO. As described above, the CNN may have a multi layered structure, and the preset filtering process of the CNN may be determined in each layer. The number of and features of layers included in the CNN (i.e., filter coefficients and the number of filter taps in each layer) may be pre-defined.

As another example, a method for replacing the deblocking filter, the SAO, and an adaptive loop filter (ALF) with the CNN may be proposed.

Figure 7:
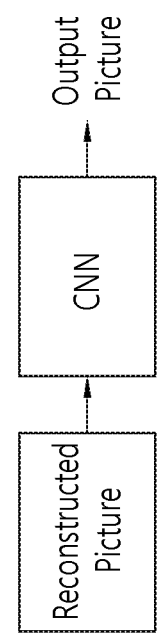
FIG. 7 illustrates an example of an image coding performed by replacing the deblocking filter, the SAO, and the ALF with the CNN.

FIG. 7 illustrates an example of the image coding performed by replacing the deblocking filter, the SAO, and the ALF with the CNN. That is, referring to FIG. 7, the encoding apparatus/the decoding apparatus may apply the CNN to the reconstructed picture in the in-loop filtering procedure applied for improving the subjective/objective image qualities.

As another example, a method for applying the filter such as the deblocking filter, the SAO, and the adaptive loop filter (ALF) and then applying the CNN in order to improve the subjective/objective image qualities may be proposed.

Figure 8:
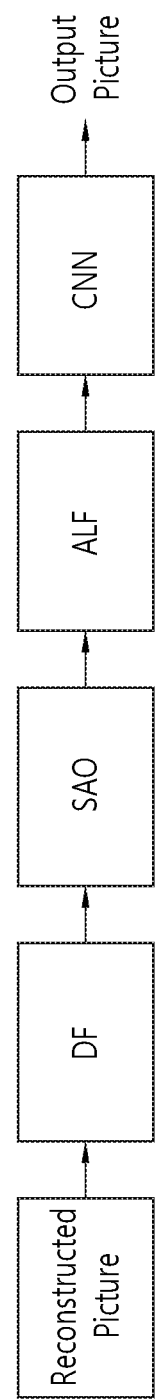
FIG. 8 illustrates an example of applying the deblocking filter, the SAO, and the ALF, and performing the CNN.

FIG. 8 illustrates an example of applying the deblocking filter, the SAO, and the ALF, and performing the CNN. That is, referring to FIG. 8, the encoding apparatus/the decoding apparatus may apply the deblocking filter, the SAO, the ALF, and the CNN to the reconstructed picture in the in-loop filtering procedure applied for improving the subjective/objective image qualities.

Meanwhile, information about the filter process performed using the CNN may be signaled.

For example, a flag representing whether additional post filtering data are transmitted may be signaled. If a value of the flag is 1, the flag may represent that the additional post filtering data are transmitted, and if the value of the flag is 0, the flag may represent that the additional post filtering data are not transmitted.

The flag may be represented as a post filter extension flag, and the flag may be signaled as expressed in Table below.

TABLE 1

| seq_parameter_set_rbsp( ) { | |
| --- | --- |
| ... | |
| sps_postfilter_extension_flag : | u(1) |
| if(sps_postfilter_extension_flag) | |
| ... | |
| } | | where the sps_postfilter_extension_flag may represent the flag. The flag may be signaled through a slice header, a picture parameter set (PPS), or a sequence parameter set (SPS).

Further, the information about the filtering process performed using the CNN may be signaled as expressed in Table below.

TABLE 2

| pic_parameter_set_rbsp( ) { | |
| --- | --- |
| ... | |
| post_filter_control_present_flag | u(1) |
| if(post_filter_control_present_flag) { | |
| Unified_post_filter_flag | u(1) |
| if(Unified_post_filter_flag) { | |
| deblocking_filter_enabled_flag | u(1) |
| SAO_enabled_flag | u(1) |
| ALF_enabled_flag } | u(1) |
| ... | |
| } | |
| } | |

For example, a flag representing whether a unified post filtering process exists may be signaled. The flag may be represented as a post filter control present flag. The post_filter_control_present_flag expressed in Table 2 may represent the syntax element for the post filter control present flag. If a value of the post filter control present flag is 1, the flag may represent that the unified post filtering process exists, and if the value of the post filter control present flag is 0, the flag may represent that the unified post filtering process does not exist. If the post filter control present flag does not exist, the value of the post filter control present flag may be regarded as 0.

Further, a flag representing whether the conventional post filtering processes such as the deblocking filter, the SAO, and the ALF are replaced with the unified post filtering process may be signaled. The flag may be represented as a unified post filter flag. The Unified_post_filter_flag expressed in Table 2 may represent the syntax element for the unified post filter flag. If a value of the unified post filter flag is 1, the flag may represent that the unified post filtering process replaces the conventional post filtering process, and if the value of the unified post filter flag is 0, the flag may represent that the unified post filtering process does not replace the conventional post filtering process. If the unified post filter flag does not exist, the value of the unified post filter flag may be regarded as 0.

Further, a flag representing whether the deblocking filter is available may be signaled. The flag may be represented as a deblocking filter available flag. The deblocking_filter_enabled_flag expressed in Table 2 may represent the syntax element for the deblocking filter available flag. If a value of the deblocking filter available flag is 1, the flag may represent that the deblocking filter is available, and if the value of the deblocking filter available flag is 0, the flag may represent that the deblocking filter is not available. If the deblocking filter available flag does not exist, the value of the deblocking filter available flag may be regarded as 0.

Further, a flag representing whether the SAO is available may be signaled. The flag may be represented as an SAO available flag. The SAO_enabled_flag expressed in Table 2 may represent the syntax element for the SAO available flag. If a value of the SAO available flag is 1, the flag may represent that the SAO post filtering is available, and if the value of the SAO available flag is 0, the flag may represent that the SAO post filtering is not available. If the SAO available flag does not exist, the value of the SAO available flag may be regarded as 0.

Further, a flag representing whether the ALF is available may be signaled. The flag may be represented as an ALF available flag. The ALF_enabled_flag expressed in Table 2 may represent the syntax element for the ALF available flag. If a value of the ALF available flag is 1, the flag may represent that the ALF filtering is available, and if the value of the ALF available flag is 0, the flag may represent that the ALF filtering is not available. If the ALF available flag does not exist, the value of the ALF available flag may be regarded as 0.

Meanwhile, the aforementioned syntax elements may be signaled through the slice header, the picture parameter set (PPS), or the sequence parameter set (SPS).

Meanwhile, as another example, a method for performing the filtering based on the CNN selected from the plurality of CNNs may be proposed.

Figure 9:
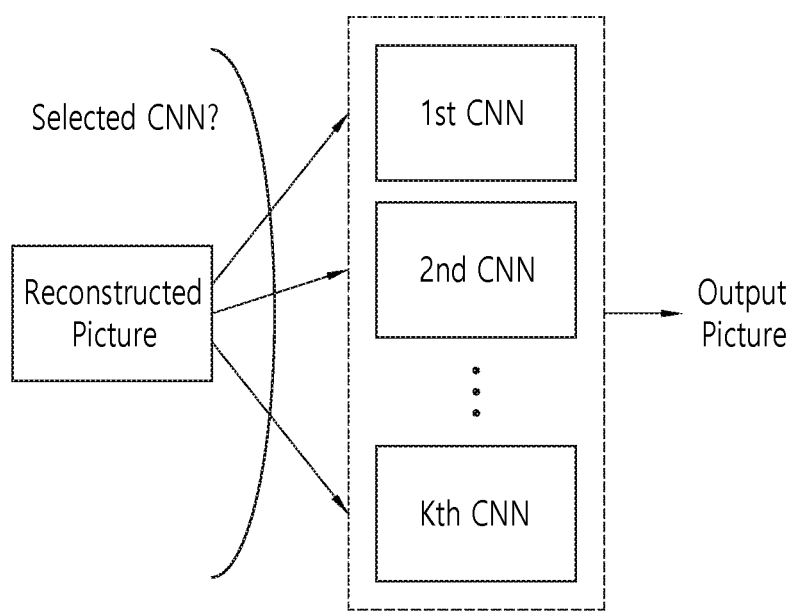
FIG. 9 illustrates an example of performing a filtering for a reconstructed picture based on a CNN selected from a plurality of CNNs.

FIG. 9 illustrates an example of performing the filtering on the reconstructed picture based on the CNN selected from the plurality of CNNs.

For example, the encoding apparatus may perform various CNN-based filterings for the reconstructed picture, and select a CNN having optimal objective performance among the plurality of CNNs. Further, the encoding apparatus may signal an index indicating the CNN selected from the plurality of CNNs. The decoding apparatus may receive the index, and refine the reconstructed picture by performing the filtering of the reconstructed picture based on the CNN indicated by the index.

Further, for example, the encoding apparatus may perform various CNN-based filterings for residual data, that is, residual samples for the current picture, and select a CNN having optimal objective performance among the plurality of CNNs. The encoding apparatus may signal an index indicating the CNN selected from the plurality of CNNs. The decoding apparatus may receive the index, perform the filtering for the residual samples for the current picture based on the CNN indicated by the index, and refine the reconstructed picture through the filtered residual samples. For example, a first CNN illustrated in FIG. 9 may include five convolution layers, and ten available filter sets may be used based on the extracted filter. Further, a second CNN may include three convolution layers, and five available filter sets may be used based on the extracted filter. Further, each CNN may have input blocks having different sizes. That is, the size of the input block for each CNN may be different.

Figure 10:
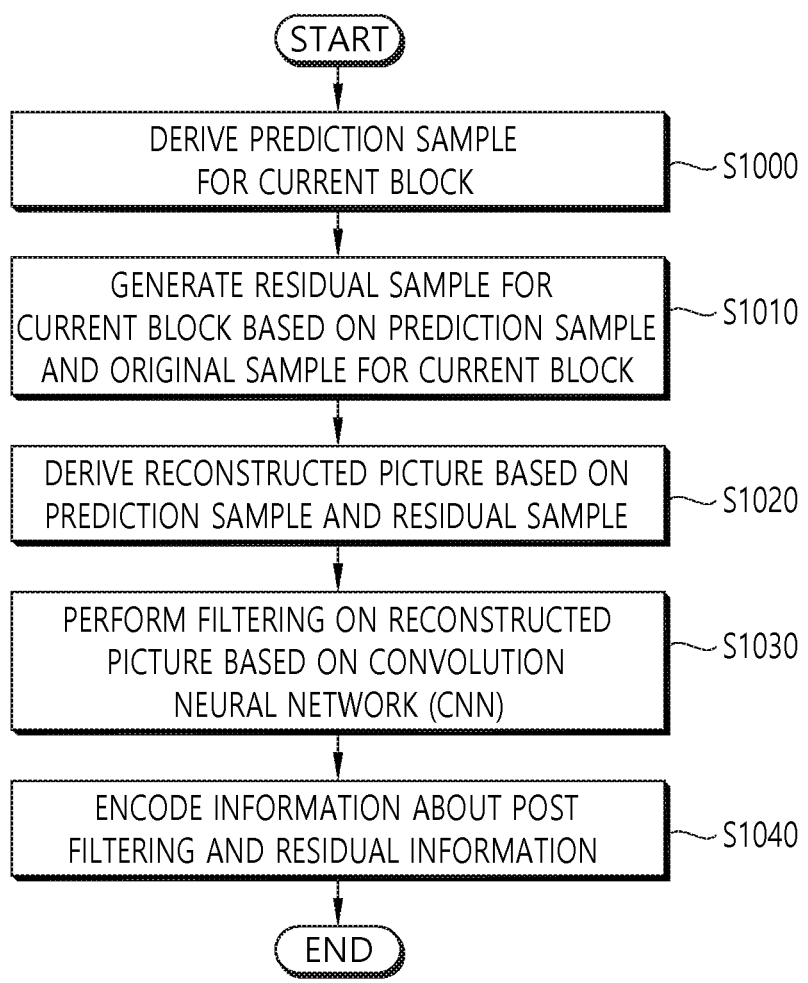
FIG. 10 schematically illustrates an image encoding method by an encoding apparatus according to the present disclosure.

FIG. 10 schematically illustrates an image encoding method by the encoding apparatus according to the present disclosure. A method illustrated in FIG. 10 may be performed by the encoding apparatus illustrated in FIG. 1. Specifically, for example, S1000 illustrated in FIG. 10 may be performed by the predictor of the encoding apparatus, S1010 may be performed by the subtractor of the encoding apparatus, S1020 may be performed by the adder of the encoding apparatus, S1030 may be performed by the filter of the encoding apparatus, and S1040 may be performed by the entropy encoder of the encoding apparatus.

The encoding apparatus derives a prediction sample for a current block (S1000).

The encoding apparatus may derive the prediction sample for the current block by performing intra prediction or inter prediction for the current block.

The encoding apparatus may determine whether the intra prediction is applied to the current block or the inter prediction is applied thereto. If the inter prediction is applied to the current block, the encoding apparatus may derive motion information about the current block by applying a skip mode, a merge mode, an AMVP mode, or the like, and derive the prediction sample for the current block based on the motion information. Here, the motion information may include a motion vector and a reference picture index.

As an example, if the skip mode or the merge mode is applied to the current block, the encoding apparatus may configure a merge candidate list with the motion information of an available neighboring block, select one of merge candidates included in the merge candidate list, and derive the selected merge candidate as the motion information for the current block. In this case, the encoding apparatus may encode a merge index indicating the merge candidate selected from the merge candidates of the merge candidate list. The merge index may be included in prediction information for the current block.

Further, if the AMVP mode is applied to the current block, the encoding apparatus may generate a motion vector predictor candidate list using a motion vector of a spatial neighboring block of the current block and/or a motion vector corresponding to a Col block which is a temporal neighboring block. That is, the motion vector of reconstructed spatial neighboring block and/or the motion vector corresponding to the Col block which is the temporal neighboring block may be used as motion vector predictor candidates. The encoding apparatus may select one of the motion vector predictor candidates included in the list, and derive the motion vector for the current block using the selected motion vector predictor candidate as the motion vector predictor. Further, the encoding apparatus may obtain a motion vector difference (MVD) between the motion vector and motion vector predictor of the current block, and encode and output the motion vector difference in a form of a bitstream. That is, the MVD may be obtained as a value obtained by subtracting the motion vector predictor from the motion vector of the current block. Further, the encoding apparatus may encode a motion vector predictor index indicating the selected motion vector predictor candidate among the motion vector predictor candidates included in the list. The motion vector predictor index may be included in the prediction information for the current block. Further, the encoding apparatus may derive a reference picture for the current block, and encode a reference picture index indicating the reference picture. The reference picture index may be included in the prediction information.

Further, in the case of the intra prediction, the encoding apparatus may induce the prediction sample for the current block based on the neighboring reference sample within the current picture. The encoding apparatus may induce the prediction sample for the current block by applying a directional mode or a non-directional mode based on the neighboring reference sample of the current block. At this time, a prediction mode to be applied to the current block may also be determined using an intra prediction mode of the neighboring block.

Meanwhile, the encoding apparatus may encode the prediction information for the current block. The prediction information may include information representing whether the intra prediction is applied to the current block or the inter prediction is applied thereto. Further, the prediction information may include information representing whether the merge mode is applied to the current block or the AMVP mode is applied thereto.

The encoding apparatus generates a residual sample for the current block based on the prediction sample and an original sample for the current block (S1010). The encoding apparatus may derive the residual sample by adding the original sample and prediction sample for the current block.

The encoding apparatus derives a reconstructed picture based on the prediction sample and the residual sample (S1020). The encoding apparatus may generate a reconstructed sample based on the prediction sample and the residual sample, and derive the reconstructed block or the reconstructed picture based on the reconstructed sample.

The encoding apparatus performs a filtering on the reconstructed picture based on the convolution neural network (CNN) (S1030).

As an example, the encoding apparatus may split the reconstructed picture into input blocks having a specific size. The specific size may be a 3×3 size or a 5×5 size. Alternatively, the input blocks may be a coding tree unit (CTU).

The encoding apparatus may derive features by performing the convolution operation for each of the input blocks based on the kernel for the CNN, and determine a filter set based on the features. The encoding apparatus may perform the filtering on the reconstructed picture based on the filter set. The filter set may include filter taps and filter coefficients.

Meanwhile, for example, the encoding apparatus may select one of the plurality of CNNs, and perform the filtering on the reconstructed picture based on the selected CNN. The encoding apparatus may generate an index indicating the CNN selected from the plurality of CNNs, and signal the index.

Meanwhile, the encoding apparatus may also perform the adaptive loop filter (ALF) on the filtered reconstructed picture based on the CNN.

Further, as another example, the encoding apparatus may perform the deblocking filtering, the SAO, and/or the ALF on the reconstructed picture, and split the filtered reconstructed picture into input blocks having a specific size. The specific size may be a 3×3 size or a 5×5 size. Alternatively, the input blocks may be a coding tree unit (CTU).

The encoding apparatus may derive features by performing the convolution operation for each of the input blocks based on the kernel for the CNN, and determine a filter set based on the features. The encoding apparatus may perform the filtering on the reconstructed picture based on the filter set. The filter set may include filter taps and filter coefficients.

Further, as still another example, the encoding apparatus may perform the filtering on the residual samples of the current picture based on the CNN. For example, the encoding apparatus may split a residual picture including the residual samples into input blocks having a specific size. The specific size may be a 3×3 size or a 5×5 size. Alternatively, the input blocks may be a coding tree unit (CTU).

The encoding apparatus may derive features by performing the convolution operation for each of the input blocks based on the kernel for the CNN, and determine a filter set based on the features. The encoding apparatus may perform the filtering for the residual samples based on the filter set. The filter set may include filter taps and filter coefficients. The encoding apparatus may derive a reconstructed picture for the current picture based on the filtered residual samples and the prediction samples.

The encoding apparatus encodes information about the post filtering and residual information (S1040).

For example, the encoding apparatus may encode a flag representing whether the information about the post filtering is transmitted.

Alternatively, for example, the encoding apparatus may encode a flag representing whether the post filtering is performed. If a value of the flag is 1, the information about the post filtering may be encoded through the bitstream. The information about the post filtering may include a flag representing whether a unified post filtering is performed, a flag representing whether the deblocking filtering is available, a flag representing whether the SAO is available, and/or a flag representing whether the ALF is available. Here, the unified post filtering may represent the CNN-based filtering. That is, the flag may represent whether the CNN-based filtering is performed. Meanwhile, if the flat representing whether the deblocking filtering is available does not exist, a value of the flag representing whether the deblocking filtering is available may be regarded as 0. Further, if the flag representing whether the SAO is available does not exist, a value of the flag representing whether the SAO is available may be regarded as 0. Further, if the flag representing whether the ALF is available does not exist, a value of the flag representing whether the ALF is available may be regarded as 0.

Further, the encoding apparatus may derive a transform coefficient by performing the transform for the residual sample, and perform the entropy encoding for the transform coefficient. The entropy encoding may include encoding methods, for example, such as an exponential Golomb coding, a context-adaptive variable length coding (CAVLC), and a context-adaptive binary arithmetic coding (CABAC).

Further, the encoding apparatus may encode the information about the current block. The information about the current block may include the prediction information.

Meanwhile, the bitstream may be transmitted to the decoding apparatus through a network or a (digital) storage medium. Here, the network may include a broadcasting network and/or a communication network, and the like, and the digital storage medium may include various storage media such as USB, SD, CD, DVD, blue-ray, HDD, and SSD.

Figure 11:
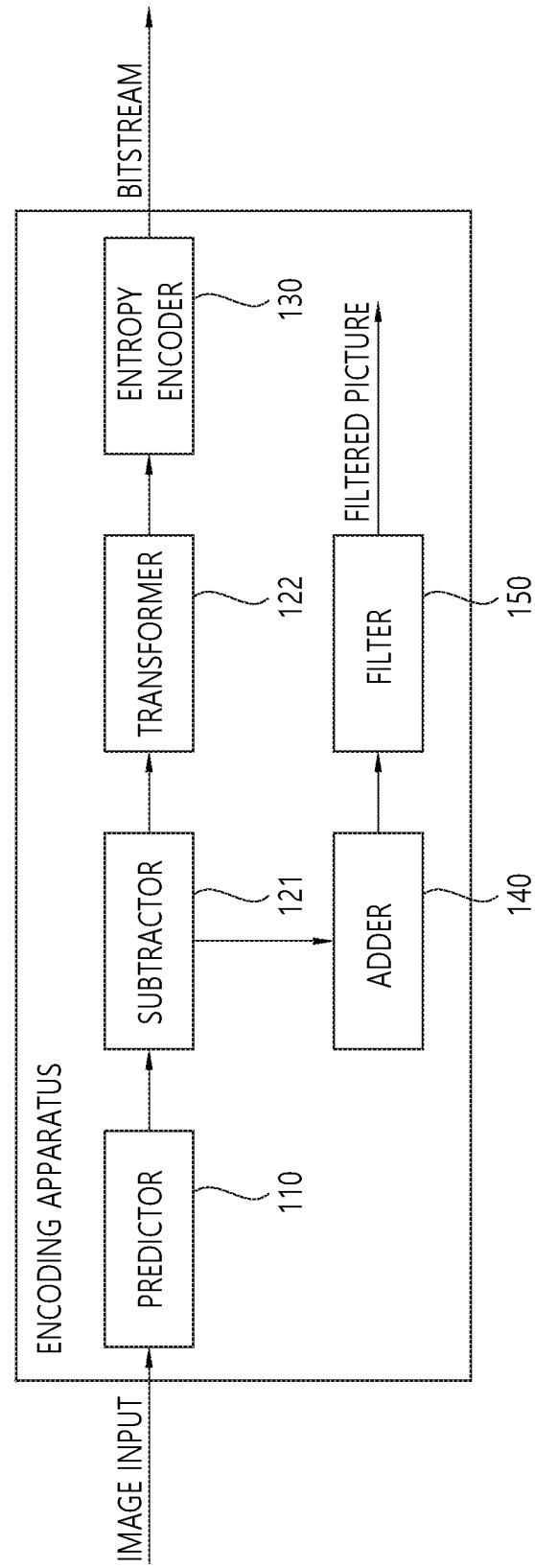
FIG. 11 schematically illustrates the encoding apparatus for performing the image encoding method according to the present disclosure.

FIG. 11 schematically illustrates the encoding apparatus for performing an image encoding method according to the present disclosure. The method illustrated in FIG. 10 may be performed by the encoding apparatus illustrated in FIG. 11. Specifically, for example, the predictor of the encoding apparatus illustrated in FIG. 11 may perform the S1000 illustrated in FIG. 10, the subtractor of the encoding apparatus illustrated in FIG. 11 may perform the S1010 illustrated in FIG. 10, the adder of the encoding apparatus illustrated in FIG. 11 may perform the S1020 illustrated in FIG. 10, the filter of the encoding apparatus illustrated in FIG. 11 may perform the S1030 illustrated in FIG. 10, and the entropy encoder of the encoding apparatus illustrated in FIG. 11 may perform the S1040 illustrated in FIG. 10. Further, although not illustrated, a process of generating the residual information for the current block based on the residual sample may be performed by the transformer of the encoding apparatus illustrated in FIG. 11.

Figure 12:
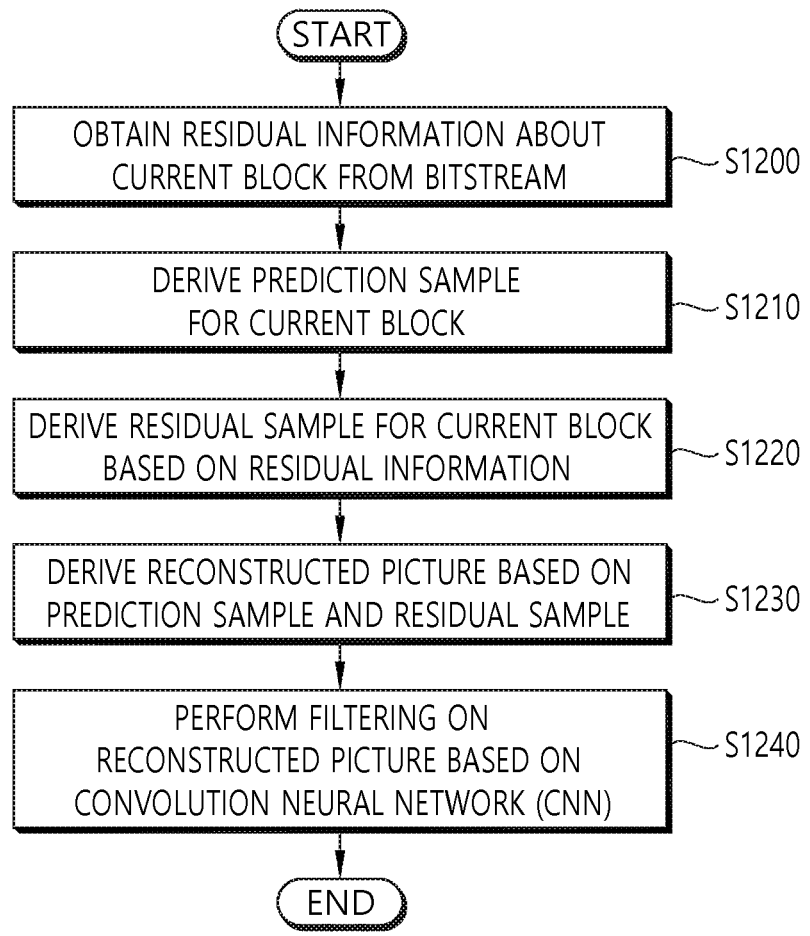
FIG. 12 schematically illustrates an image decoding method by a decoding apparatus according to the present disclosure.

FIG. 12 schematically illustrates an image decoding method by the decoding apparatus according to the present disclosure. A method illustrated in FIG. 12 may be performed by the decoding apparatus illustrated in FIG. 2. Specifically, for example, S1200 illustrated in FIG. 12 may be performed by the entropy decoder of the decoding apparatus, S1210 may be performed by the predictor of the decoding apparatus, S1220 may be performed by the inverse transformer of the decoding apparatus, S1230 may be performed by the adder of the decoding apparatus, and S1240 may be performed by the filter of the decoding apparatus.

The decoding apparatus acquires residual information for a current block from a bitstream (S1200). The decoding apparatus may derive transform coefficients of the current block by decoding the residual information signaled through the bitstream.

The decoding apparatus derives a prediction sample for the current block (S1210). The decoding apparatus may derive the prediction sample for the current block by performing intra prediction or inter prediction for the current block.

The decoding apparatus may acquire information about the prediction of the current block through the bitstream, and determine whether the intra prediction is to be applied to the current block or the inter prediction is to be applied thereto based on the information about the prediction.

In the case of the intra prediction, the decoding apparatus may induce a prediction sample for a current block based on a neighboring reference sample within a current picture. The decoding apparatus may induce the prediction sample for the current block by applying a directional mode or a non-directional mode based on the neighboring reference sample of the current block. At this time, a prediction mode to be applied to the current block may also be determined using an intra prediction mode of the neighboring block.

In the case of the inter prediction, the decoding apparatus may induce a prediction sample for a current block based on a sample specified on a reference picture by a motion vector on the reference picture. The decoding apparatus may induce the prediction sample for the current block by applying any one of a skip mode, a merge mode, and an MVP mode. At this time, motion information necessary for the inter prediction of the current block provided by the video encoding apparatus, for example, information about a motion vector, a reference picture index, and the like may be acquired or induced based on the information about the prediction.

In the case of the skip mode and the merge mode, the motion information of the neighboring block may be used as the motion information of the current block. At this time, the neighboring block may include a spatial neighboring block and a temporal neighboring block.

The decoding apparatus may configure a merge candidate list with the motion information of the available neighboring block, and use information indicated by a merge index on the merge candidate list as a motion vector of a current block. The merge index may be signaled by the encoding apparatus. The motion information may include the motion vector and the reference picture. If the motion information of the temporal neighboring block is used in the skip mode and the merge mode, a top-level picture in the reference picture list may be used as the reference picture.

In the case of the skip mode, a difference (residual) between a prediction sample and an original sample is not transmitted unlike the merge mode.

In the case of the MVP mode, a motion vector of a current block may be induced using a motion vector of a neighboring block as a motion vector predictor. At this time, the neighboring block may include a spatial neighboring block and a temporal neighboring block.

As an example, if the merge mode is applied, a merge candidate list may be generated using a motion vector of the reconstructed spatial neighboring block and/or a motion vector corresponding to a Col block which is the temporal neighboring block. In the merge mode, a motion vector of a candidate block selected from the merge candidate list is used as a motion vector of a current block. The information about the prediction may include a merge index indicating a candidate block having an optimal motion vector selected from the candidate blocks included in the merge candidate list. At this time, the decoding apparatus may derive the motion vector of the current block using the merge index.

As another example, if the motion vector prediction (MVP) mode is applied, a motion vector predictor candidate list may be generated using a motion vector of a reconstructed spatial neighboring block and/or a motion vector corresponding to a Col block which is the temporal neighboring block. That is, the motion vector of the reconstructed spatial neighboring block and/or the motion vector corresponding to the Col block which is the temporal neighboring block may be used as the motion vector predictor candidate. The information about the prediction may include a motion vector predictor (MVP) index indicating an optimal motion vector predictor candidate selected from the motion vector predictor candidates included in the list. At this time, the decoding apparatus may select a motion vector predictor of a current block among the motion vector predictor candidates included in the motion vector predictor candidate list using the MVP index. The decoding apparatus may acquire a motion vector difference (MVD) included in the information about the prediction, and derive the motion vector of the current block through the addition of the motion vector difference and the motion vector predictor. Further, the predictor may acquire or induce a reference picture index indicating a reference picture or the like from the information about the prediction.

The decoding apparatus derives a residual sample for the current block based on the residual information (S1220). The decoding apparatus may derive transform coefficients of the current block by decoding the residual information signaled through the bitstream, and derive a residual sample for the current block by performing an inverse transform for the transform coefficients.

The decoding apparatus derives the reconstructed picture based on the prediction sample and the residual sample (S1230). The decoding apparatus may generate a reconstructed sample based on the prediction sample and the residual sample, and derive the reconstructed block or the reconstructed picture based on the reconstructed sample.

The decoding apparatus performs a filtering on the reconstructed picture based on the convolution neural network (CNN) (S1240).

As an example, the decoding apparatus may split the reconstructed picture into input blocks having a specific size. The specific size may be a 3×3 size or a 5×5 size. Alternatively, the input blocks may be a coding tree unit (CTU).

The decoding apparatus may derive features by performing the convolution operation for each of the input blocks based on the kernel for the CNN, and determine a filter set based on the features. The decoding apparatus may perform the filtering on the reconstructed picture based on the filter set. The filter set may include filter taps and filter coefficients.

Meanwhile, the decoding apparatus may acquire an index indicating one of the plurality of CNNs through the bitstream, and select the CNN for the reconstructed picture based on the index. The decoding apparatus may perform the filtering on the reconstructed picture based on the selected CNN.

Meanwhile, the decoding apparatus may also perform the adaptive loop filter (ALF) on the filtered reconstructed picture based on the CNN.

Further, as another example, the decoding apparatus may perform the deblocking filtering, the SAO, and/or the ALF on the reconstructed picture, and split the filtered reconstructed picture into the input blocks having a specific size. The specific size may be a 3×3 size or a 5×5 size. Alternatively, the input blocks may be a coding tree unit (CTU).

The decoding apparatus may derive features by performing the convolution operation for each of the input blocks based on the kernel for the CNN, and determine a filter set based on the features. The decoding apparatus may perform the filtering on the reconstructed picture based on the filter set. The filter set may include filter taps and filter coefficients.

Meanwhile, the decoding apparatus may acquire a flag representing whether information about a post filtering is transmitted through the bitstream, and acquire the information about the post filtering through the bitstream if a value of the flag is 1.

Alternatively, the decoding apparatus may acquire the flag representing whether the post filtering is performed through the bitstream, and acquire the information about the post filtering through the bitstream if the value of the flag is 1. The information about the post filtering may include a flag representing whether a unified post filtering is performed, a flag representing whether the deblocking filtering is available, a flag representing whether the SAO is available, and/or a flag representing whether the ALF is available.

For example, if a value of the flag representing whether the post filtering is performed is 1, the flag representing whether the unified post filtering is performed through the bitstream may be acquired. Here, the unified post filtering may represent the CNN-based filtering. That is, the flag may represent whether the CNN-based filtering is performed. If the value of the flag representing whether the unified post filtering is performed is 0, the filtering performed based on the CNN may not be performed for the reconstructed picture.

If the value of the flag representing whether the unified post filtering is performed is 1, the decoding apparatus may acquire the flag representing whether the deblocking filtering is available through the bitstream, the flag representing whether the SAO is available, and the flag representing whether the ALF is available. If the value of the flag representing whether the deblocking filtering is available is 0, the deblocking filtering on the reconstructed picture may not be performed. Further, if the value of the flag representing whether the SAO is available is 0, the SAO for the reconstructed picture may not be performed. Further, if the value of the flag representing whether the ALF is available is 0, the ALF for the reconstructed picture may not be performed. Meanwhile, if the flag representing whether the deblocking filtering is available does not exist, the value of the flag representing whether the deblocking filtering is available may be regarded as 0. Further, if the flag representing whether the SAO is available does not exist, the value of the flag representing whether the SAO is available may be regarded as 0. Further, if the flag representing whether the ALF is available does not exist, the value of the flag representing whether the ALF is available may be regarded as 0.

Further, as another example, the decoding apparatus may perform the filtering on the residual samples of the current picture based on the CNN. For example, the decoding apparatus may split the residual picture including the residual samples into input blocks having a specific size. The specific size may be a 3×3 size or a 5×5 size. Alternatively, the input blocks may be a coding tree unit (CTU).

The decoding apparatus may derive features by performing the convolution operation for each of the input blocks based on the kernel for the CNN, and determine a filter set based on the features. The decoding apparatus may perform the filtering for the residual samples based on the filter set. The filter set may include filter taps and filter coefficients. The decoding apparatus may derive a reconstructed picture for the current picture based on the filtered residual samples and prediction samples.

Figure 13:
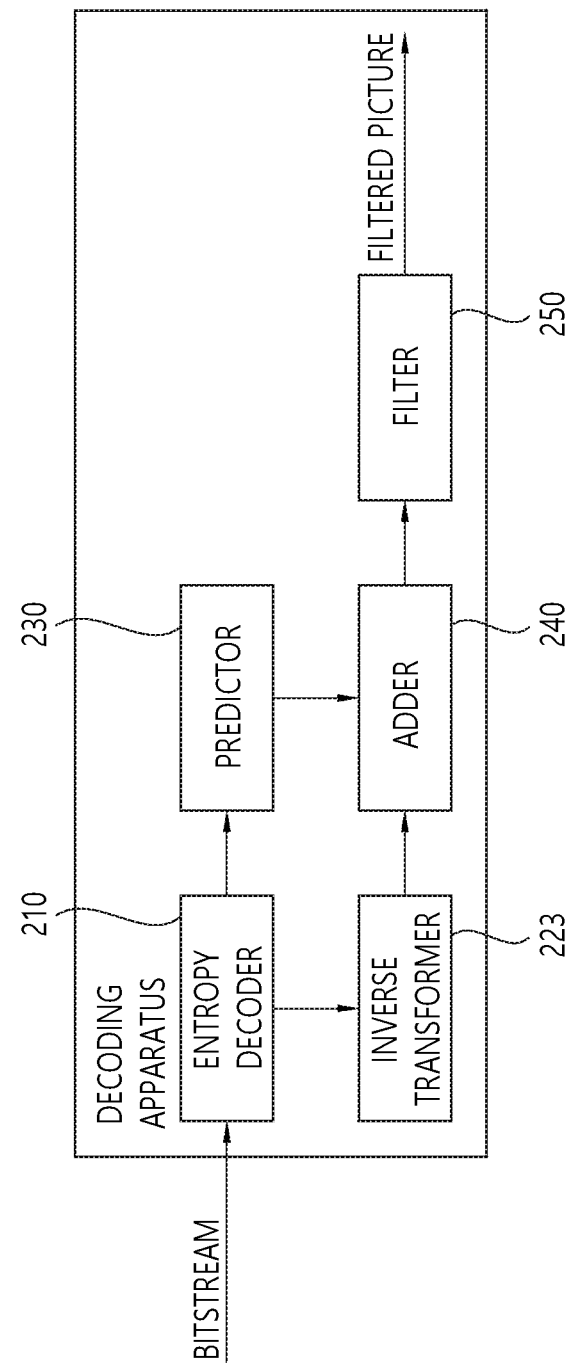
FIG. 13 schematically illustrates the decoding apparatus for performing the image decoding method according to the present disclosure.

FIG. 13 schematically illustrates the decoding apparatus for performing the image decoding method according to the present disclosure. The method illustrated in FIG. 12 may be performed by the decoding apparatus illustrated in FIG. 13. Specifically, for example, the entropy decoder of the decoding apparatus illustrated in FIG. 13 may perform the S1200 illustrated in FIG. 12, the predictor of the decoding apparatus illustrated in FIG. 12 may perform the S1210 illustrated in FIG. 12, the transformer of the decoding apparatus illustrated in FIG. 12 may perform the S1220 illustrated in FIG. 12, the adder of the decoding apparatus illustrated in FIG. 12 may perform the S1230 illustrated in FIG. 12, and the filter of the decoding apparatus illustrated in FIG. 12 may perform the S1240 illustrated in FIG. 12.

The aforementioned present disclosure may perform the filtering by performing the filtering based on the convolution neural network (CNN) to reflect the characteristics of the current picture, thereby improving the subjective/objective image qualities.

Further, the aforementioned present disclosure may perform the filtering based on the convolution neural network (CNN) to replace the conventional post filtering process such as the deblocking filtering, the SAO, and/or the ALF, thereby improving the subjective/objective image qualities.

In the above-described embodiments, the methods are explained based on flowcharts by means of a series of steps or blocks, but the present disclosure is not limited to the order of steps, and a certain step may occur in order or step different from that described above, or concurrently with another step. Further, it may be understood by a person having ordinary skill in the art that the steps shown in a flowchart are not exclusive, and that another step may be incorporated or one or more steps of the flowchart may be removed without affecting the scope of the present disclosure.

The above-described methods according to the present disclosure may be implemented as a software form, and an encoding device and/or decoding device according to the disclosure may be included in a device for image processing, such as, a TV, a computer, a smartphone, a set-top box, a display device or the like.

When embodiments in the present disclosure are embodied by software, the above-described methods may be embodied as modules (processes, functions or the like) to perform the above-described functions. The modules may be stored in a memory and may be executed by a processor. The memory may be inside or outside the processor and may be connected to the processor via a well-known various means. The processor may include an application-specific integrated circuit (ASIC), other chipset, logic circuit, and/or a data processing device. The memory may include a read-only memory (ROM), a random access memory (RAM), a flash memory, a memory card, a storage medium, and/or other storage device. That is, embodiments described in the present disclosure may be embodied and performed on a processor, a microprocessor, a controller or a chip. For example, function units shown in each drawing may be embodied and performed on a computer, a processor, a microprocessor, a controller or a chip.

Further, the decoding device and the encoding device to which the present disclosure is applied may be included in a multimedia broadcasting transceiver, a mobile communication terminal, a home cinema video device, a digital cinema video device, a surveillance camera, a video chat device, a real time communication device such as video communication, a mobile streaming device, a storage medium, a camcorder, a video on demand (VoD) service providing device, an over the top (OTT) video device, an Internet streaming service providing device, a three-dimensional (3D) video device, a video telephony video device, and a medical video device, and may be used to process a video signal or a data signal. For example, the over the top (OTT) video device may include a game console, a Blu-ray player, an Internet access TV, a Home theater system, a smartphone, a Tablet PC, a digital video recorder (DVR) and the like.

In addition, the processing method to which the present disclosure is applied may be produced in the form of a program executed by a computer, and be stored in a computer-readable recording medium. Multimedia data having a data structure according to the present disclosure may also be stored in a computer-readable recording medium. The computer-readable recording medium includes all kinds of storage devices and distributed storage devices in which computer-readable data are stored. The computer-readable recording medium may include, for example, a Blu-ray Disc (BD), a universal serial bus (USB), a ROM, a PROM, an EPROM, an EEPROM, a RAM, a CD-ROM, a magnetic tape, a floppy disk, and an optical data storage device. Further, the computer-readable recording medium includes media embodied in the form of a carrier wave (for example, transmission over the Internet). In addition, a bitstream generated by the encoding method may be stored in a computer-readable recording medium or transmitted through a wired or wireless communication network. Additionally, the embodiments of the present disclosure may be embodied as a computer program product by program codes, and the program codes may be executed on a computer by the embodiments of the present disclosure. The program codes may be stored on a computer-readable carrier.

Further, the contents streaming system to which the present disclosure is applied may largely include an encoding server, a streaming server, a web server, a media storage, a user equipment, and a multimedia input device.

The encoding server functions to compress to digital data the contents input from the multimedia input devices, such as the smart phone, the camera, the camcoder and the like, to generate a bitstream, and to transmit it to the streaming server. As another example, in a case where the multimedia input device, such as, the smart phone, the camera, the camcoder or the like, directly generates a bitstream, the encoding server may be omitted. The bitstream may be generated by an encoding method or a bitstream generation method to which the present disclosure is applied. And the streaming server may store the bitstream temporarily during a process to transmit or receive the bitstream.

The streaming server transmits multimedia data to the user equipment based on a user's request through the web server, which functions as an instrument that informs a user of what service there is. When the user requests a service which he or she wants, the web server transfers it to the streaming server, and the streaming server transmits multimedia data to the user. In this regard, the contents streaming system may include a separate control server, and in this case, the control server functions to control commands/responses between respective equipments in the content streaming system.

The streaming server may receive contents from the media storage and/or the encoding server. For example, in a case the contents are received from the encoding server, the contents may be received in real time. In this case, the streaming server may store the bitstream for a predetermined period of time to provide the streaming service smoothly.

For example, the user equipment may include a mobile phone, a smart phone, a laptop computer, a digital broadcasting terminal, a personal digital assistant (PDA), a portable multimedia player (PMP), a navigation, a slate PC, a tablet PC, an ultrabook, a wearable device (e.g., a watch-type terminal (smart watch), a glass-type terminal (smart glass), a head mounted display (HMD)), a digital TV, a desktop computer, a digital signage or the like. Each of servers in the contents streaming system may be operated as a distributed server, and in this case, data received by each server may be processed in distributed manner.

What is claimed is:

1. An image decoding method performed by a decoding apparatus comprising:
    obtaining residual information about a current block from a bitstream;
    obtaining an index indicating one of a plurality of Convolution Neural Networks (CNNs) from the bitstream;
    deriving a prediction sample for the current block;
    deriving a residual sample for the current block based on the residual information;
    deriving a reconstructed picture based on the prediction sample and the residual sample;
    selecting a CNN for the reconstructed picture based on the index; and
    performing a filtering on the reconstructed picture based on the selected CNN,
    wherein performing the filtering on the reconstructed picture comprises:

splitting the reconstructed picture into input blocks having a specific size,
deriving features by performing a convolution operation for each of the input blocks based on a kernel for the selected CNN,
determining a filter set based on the features, and
performing a filtering on the reconstructed picture based on the filter set.

2. The image decoding method of claim 1, wherein the sizes of the input blocks are 3×3 sizes or 5×5 sizes.

3. The image decoding method of claim 1, comprising:
obtaining a flag indicating whether a post filtering is performed through the bitstream; and
obtaining a flag indicating whether the CNN-based filtering is performed through the bitstream, based on a value of the flag indicating whether the post filtering is performed being 1.

4. The image decoding method of claim 3, comprising: obtaining a flag indicating whether a deblocking filtering is available, a flag indicating whether a sample adaptive offset (SAO) is available, and a flag indicating whether an adaptive loop filter (ALF) is available through the bitstream, based on the value of the flag indicating whether the CNN-based filtering is performed being 1.

5. The image decoding method of claim 1, wherein performing the filtering on the reconstructed picture comprises:
performing a deblocking filtering, a sample adaptive offset (SAO), and an adaptive loop filter (ALF) on the reconstructed picture;
splitting the filtered reconstructed picture into input blocks having a specific size;
deriving features by performing a convolution operation for each of the input blocks based on a kernel for the selected CNN;
determining a filter set based on the features; and
performing a filtering on the reconstructed picture based on the filter set.

6. The image decoding method of claim 1, wherein each CNN of the plurality of CNNs is different from other CNNs in at least one of a number of layers, a number of filter taps, or filter coefficients.

7. An image encoding method performed by an encoding apparatus, the method comprising:
deriving a prediction sample for a current block;
generating a residual sample for the current block based on the prediction sample and an original sample for the current block;
deriving a reconstructed picture based on the prediction sample and the residual sample;
selecting a convolution neural network (CNN) for the reconstructed picture from among a plurality of CNNs;
performing a filtering on the reconstructed picture based on the selected CNN; and
encoding information about a post filtering, residual information and an index indicating the selected CNN among the plurality of CNNs,
wherein performing the filtering on the reconstructed picture comprises:
splitting the reconstructed picture into input blocks having a specific size,
deriving features by performing a convolution operation for each of the input blocks based on a kernel for the selected CNN,
determining a filter set based on the features, and
performing a filtering on the reconstructed picture based on the filter set.

8. The image encoding method of claim 7, wherein the sizes of the input blocks are 3×3 sizes or 5×5 sizes.

9. The image encoding method of claim 7, wherein the information about the post filtering comprises: a flag indicating whether a post filtering is performed and a flag indicating whether the CNN-based filtering is performed.

* * * * *